D. I. GRIFFITH.
NUT LOCK.
APPLICATION FILED JAN. 31, 1908.
910,666.
Patented Jan. 26, 1909.
2 SHEETS—SHEET 1.
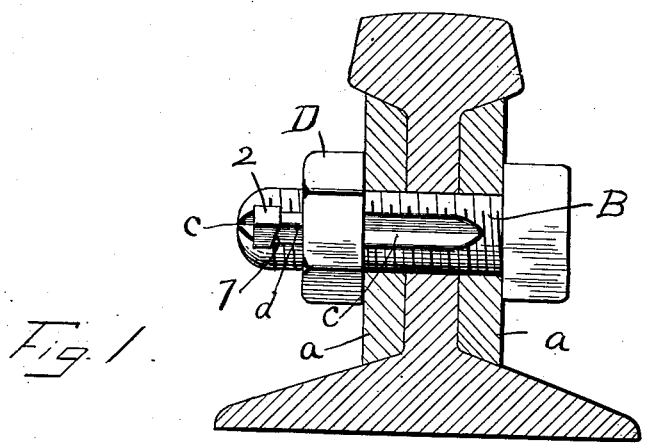
Fig. 1.
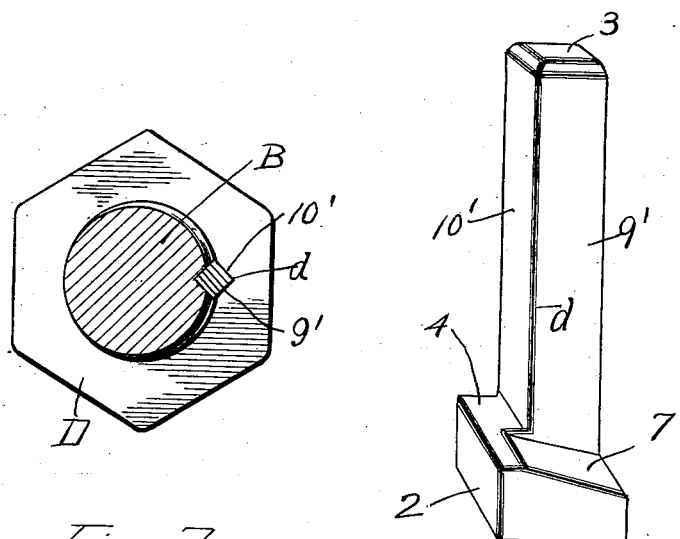
Fig. 2.
Fig. 3.
Witnesses
J. C. Simpson
Geo. W. Sues
Inventor
David I. Griffith,
By Chandler & Chandler
Attorneys
THE NORRIS PETERS CO., WASHINGTON, D. C.

D. I. GRIFFITH.
NUT LOCK.
APPLICATION FILED JAN. 31, 1908.

910,666.

Patented Jan. 26, 1909.

2 SHEETS—SHEET 2.

Witnesses
J. C. Simpson
Geo. W. Sues

Inventor
David I. Griffith.
By Chandler & Chandler
Attorneys.

UNITED STATES PATENT OFFICE.

DAVID I. GRIFFITH, OF FROSTBURG, MARYLAND.

NUT-LOCK.

No. 910,666.  Specification of Letters Patent.  Patented Jan. 26, 1909.

Application filed January 31, 1908. Serial No. 413,676.

*To all whom it may concern:*

Be it known that I, DAVID I. GRIFFITH, a citizen of the United States, residing at Frostburg, in the county of Allegany, State of Maryland, have invented certain new and useful Improvements in Nut-Locks; and I do hereby declare the following to be a full, clear, and exact description of the invention, such as will enable others skilled in the art to which it appertains to make and use the same.

This invention relates to a new and useful improvement in nut locks.

The object of my invention is to provide a bolt and nut adapted to be used in connection with a locking key, so constructed that after said key is placed to lock said nut, the same may be readily removed to permit the unthreading of the nut without injury to the bolt, nut or key, said instrumentalities being so arranged that said key may be reinserted after the bolt has again been properly set.

Figure 4:
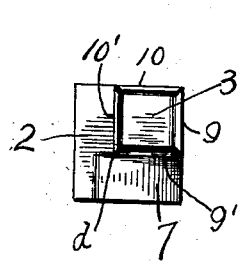
Figure 5:
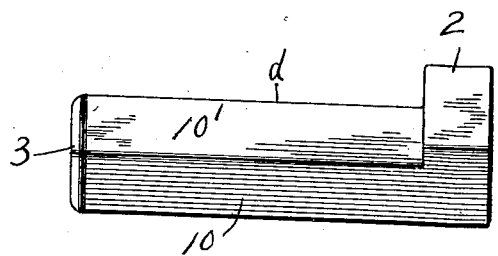

In the accompanying drawings I have shown in Figure 1 an elevation partly in section of the nut lock embodying my invention. Fig. 2 shows an end view of the bolt, nut and key, the bolt being shown in section. Fig. 3 shows an enlarged detail of the key. Figs. 4 and 5 show respectively, an end and side view of the key, and Fig. 6 discloses a detached view of a bolt constructed according to my invention.

The object of my invention is to provide a simple device by means of which a nut may be locked to a bolt to prevent any accidental rotation of the nut.

In carrying out the aim of my invention, I provide an ordinary bolt B with a longitudinal V-shaped channel extending through the end of the bolt as shown.

In connection with the channel-provided bolt I use an ordinary nut D.

In connection with the bolt constructed according to my invention I use a key comprising a rectangular stem provided with an enlarged square head 2, the key being slightly rounded at its end as is shown at 3 in Fig. 3. This stem is of such a size that the same will be snugly held within the seating formed by means of the channel $c$ within the bolt.

The stem and the enlarged head have two sides in common, the stem surfaces 9 and 10 coextending with the two sides of the head as disclosed in Fig. 4. The edge $d$, formed by the union of the remaining sides 9' and 10', form a cutting ridge of a depth equal to the depth of the nut threads. A portion of the head 2 is removed along one side to provide the head with a slanting undersurface 7, the remaining undersurface 4 of the head being flat and extending at right angles to the stem as shown in Fig. 3.

Figure 6:
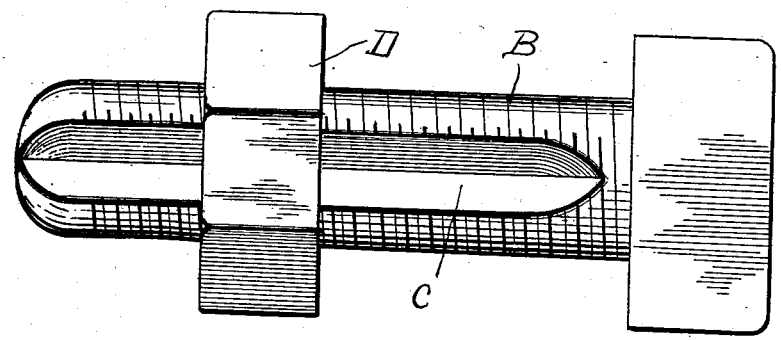

In securing two ordinary rails by means of the usual fish-plates $a$, the bolts B are so positioned that the V-shaped groove will be upon the side, as shown in Figs. 2 and 6. In this position the key is placed in the bolt channel, and driven forward, in which operation the cutting ridge $d$ of the key will cut into the threads of the nut, and so securely hold the nut. To remove the nut a chisel or other wedged-shaped tool is driven between the key-head and the nut D to remove the same. As shown in Fig 2 the key will be held equally within the nut and channel According to this construction the key may be readily removed. Even after the key is removed, it requires considerable force to remove the nut, owing to the thread mutilations. The nut can of course be used again.

What is claimed is—

1. As a new article of manufacture, a nut locking key consisting of a stem having a head at its top, the rear portions of the head being flush with the corresponding faces of the stem of the key, the front portions of the head overhanging the front faces of the stem of the key, the under side of the overhanging portion adjacent one front face lying transversely at right angles to the axis of the stem and the remaining under face of the overhanging portion of said head lying transversely at an acute angle to the axis of the stem and projecting outwardly at a right angle thereto.

2. The combination with a bolt having a longitudinal groove and a nut, of a locking key comprising a stem engaged in the groove of the bolt and through the threads of the nut and having a head at its upper end, said head being flush with the faces of the key that engage the groove of the bolt and overhanging the faces of the key that engage the nut, the under side of the portion of the head that overhangs one face of the key, being extended rearwardly and upwardly at an acute angle to the axis of the stem and projecting outwardly at a right angle thereto, as and for the purpose set forth.

In testimony whereof, I affix my signature, in presence of two witnesses.

DAVID I. GRIFFITH.

Witnesses:
 JOHN W. DEVORE,
 JOHN E. PRICE.